United States Patent
Uchihashi et al.

(10) Patent No.: US 9,862,524 B2
(45) Date of Patent: Jan. 9, 2018

(54) LIGHT-SHIELDING CONTAINER

(71) Applicant: KYORAKU CO., LTD., Kyoto (JP)

(72) Inventors: Kentaro Uchihashi, Kanagawa (JP); Takeru Sano, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 108 days.

(21) Appl. No.: 14/379,612

(22) PCT Filed: Feb. 19, 2013

(86) PCT No.: PCT/JP2013/053971
§ 371 (c)(1),
(2) Date: Aug. 19, 2014

(87) PCT Pub. No.: WO2013/125515
PCT Pub. Date: Aug. 29, 2013

(65) Prior Publication Data
US 2015/0014313 A1    Jan. 15, 2015

(30) Foreign Application Priority Data
Feb. 22, 2012    (JP) .................. 2012-036606

(51) Int. Cl.
*B65D 25/14*    (2006.01)
*B32B 1/02*     (2006.01)
(Continued)

(52) U.S. Cl.
CPC ............ *B65D 25/14* (2013.01); *B32B 1/02* (2013.01); *B32B 27/08* (2013.01); *B32B 27/20* (2013.01);
(Continued)

(58) Field of Classification Search
CPC ........ B65D 25/14; B65D 1/0215; B65D 1/00; B65D 23/0807; B65D 25/34; B65D 81/30; B32B 1/02; B32B 27/18
(Continued)

(56) References Cited

U.S. PATENT DOCUMENTS

| | | | | |
|---|---|---|---|---|
| 5,763,517 A | * | 6/1998 | Yamamoto | C08F 255/02 524/302 |
| 6,524,672 B1 | * | 2/2003 | Slat | B29C 49/0073 215/12.2 |
| 6,815,482 B1 | * | 11/2004 | Hirn | C08K 5/3475 524/359 |

(Continued)

FOREIGN PATENT DOCUMENTS

| | | |
|---|---|---|
| JP | 5-139434 | 6/1993 |
| JP | 7-40954  | 2/1995 |

(Continued)

OTHER PUBLICATIONS

Kawakami Kazumi, et al., JP07040954MT (Machine Translation), 1995, Japan.*

(Continued)

*Primary Examiner* — James C Yager
*Assistant Examiner* — Kevin C Ortman, Jr.
(74) *Attorney, Agent, or Firm* — Greenblum & Bernstein, P.L.C.

(57) ABSTRACT

Provided is a light-shielding container which has an ultraviolet-ray transmittance of 0% at wavelengths of 200-370 nm and to which contents are less apt to adhere. A light-shielding container for holding contents, characterized by having at least an inner layer composed of a thermoplastic resin, a first light-shielding layer composed of a resin containing an inorganic ultraviolet inhibitor and a second light-shielding layer composed of a resin containing an organic ultraviolet absorber, disposed in this order from the content side.

17 Claims, 2 Drawing Sheets

(51) Int. Cl.
*B65D 23/08* (2006.01)
*B65D 81/30* (2006.01)
*B65D 1/02* (2006.01)
*B32B 27/08* (2006.01)
*B32B 27/20* (2006.01)
*B32B 27/30* (2006.01)
*B32B 27/32* (2006.01)

(52) U.S. Cl.
CPC ............ *B32B 27/306* (2013.01); *B32B 27/32* (2013.01); *B32B 27/325* (2013.01); *B65D 1/0215* (2013.01); *B65D 23/0807* (2013.01); *B65D 81/30* (2013.01); *B32B 2250/24* (2013.01); *B32B 2264/102* (2013.01); *B32B 2307/412* (2013.01); *B32B 2307/71* (2013.01); *B32B 2307/7242* (2013.01); *B32B 2439/00* (2013.01)

(58) Field of Classification Search
USPC ............ 220/62.11; 215/12.2; 428/34.7, 172, 428/209, 220, 354, 412, 421, 461
See application file for complete search history.

(56) References Cited

U.S. PATENT DOCUMENTS

| | | | | |
|---|---|---|---|---|
| 2009/0220717 A1* | 9/2009 | Wilczak | ............... | B65D 1/0215 428/36.6 |
| 2010/0221578 A1* | 9/2010 | Nishio | ................... | B32B 27/18 428/702 |
| 2011/0135223 A1* | 6/2011 | Suzuki | ................... | B32B 27/32 383/114 |
| 2011/0147237 A1* | 6/2011 | Fallat | ................... | B65D 35/08 206/63.5 |
| 2012/0019906 A1* | 1/2012 | Van Nuffel | ............. | B32B 27/18 359/359 |
| 2014/0141223 A1* | 5/2014 | Yoda | ...................... | B32B 27/18 428/216 |

FOREIGN PATENT DOCUMENTS

| | | | | |
|---|---|---|---|---|
| JP | 07040954 | * | 2/1995 | ............... B65D 1/09 |
| JP | 7-257539 | | 10/1995 | |
| JP | 8-309835 | | 11/1996 | |
| JP | 2003-291988 | | 10/2003 | |
| JP | 2003-341748 | | 12/2003 | |
| JP | 2007168357 A | * | 7/2007 | ............. B32B 27/18 |
| WO | WO 2013002406 A1 | * | 1/2013 | ............. B32B 27/18 |

OTHER PUBLICATIONS

Azom ("Low Density Polyethylene—LDPE," Azom, p. 1-3, 2001).*
International Search Report for PCT/JP2013/053971 dated Apr. 16, 2013.

* cited by examiner

FIG. 3

|  |  | LIGHT-SHIELDING PROPERTY | TRANSPARENCY | ELUTING PROPERTY |
|---|---|---|---|---|
| EXAMPLES | 1 | ○ | ○ | ○ |
| | 2 | ○ | ○ | ○ |
| | 3 | ○ | ○ | ○ |
| | 4 | ○ | ○ | ○ |
| COMPARATIVE EXAMPLES | 1 | × | ○ | ○ |
| | 2 | ○ | × | ○ |
| | 3 | ○ | ○ | × |

LIGHT-SHIELDING CONTAINER

TECHNICAL FIELD

The present invention relates to a light-shielding container preventing irradiation of contents with ultraviolet-ray, particularly to a light-shielding container suitable for holding contents of which components are degraded by irradiation with ultraviolet-ray.

BACKGROUND ART

In the case of a currently marketed container constituted of a polyethylene single layer, a polyethylene terephthalate single layer or the like and having itself no light-shielding performance imparted, a light-shielding performance is imparted to a shrink film or another bag to prevent deterioration of contents due to ultraviolet-ray.

When alternate members such as a shrink film, another bag and the like are used, however, the cost increases, thus, there is a need for a light-shielding container having itself a light-shielding performance imparted.

There are documents disclosing light-shielding containers endowed with a light-shielding performance, as technical documents applied prior to the present invention (see, e.g., patent document 1 (JP-A No. 5-139434), patent document 2 (JP-A No. 7-40954) and patent document 3 (JP-A No. 2003-341748)).

In the above-described patent document 1, a polyethylene material constituting a container is blended with a white pigment or an ultraviolet absorber. By this, a container can be provided which prevents oxidative deterioration of a liquid fuel and in which the amount of a liquid fuel in the container can be easily confirmed.

In the above-described patent document 2, a light-shielding container is constituted of two layers: a layer (a) composed of a thermoplastic resin (A) and a layer (b) composed of a thermoplastic resin composition (B) containing an ultraviolet absorber, the layer (b) acting as an intermediate layer. By this, a light-shielding container can be obtained which has excellent transparency and mechanical strength, successfully blocks ultraviolet ray having a longer wavelength than 290 to 320 nm, and in which the ultraviolet absorber does not migrate into contents, thereby causing little mold pollution with the ultraviolet absorber.

In the above-described patent document 3, it is possible to provide a container having an inner layer composed of a thermoplastic resin containing a pigment having a light-shielding property and an outer layer composed of a thermoplastic resin containing a pigment having hue different from that in the inner layer, wherein a sufficient light-shielding property and any coloration of the exterior surface of the container are satisfied simultaneously by regulating the materials of the pigment having a light-shielding property and of the thermoplastic resin.

PRIOR ART REFERENCE

Patent Document

Patent document 1: JP-A No. 5-139434
Patent document 2: JP-A No. 7-40954
Patent document 4: JP-A No. 2003-341748

SUMMARY OF INVENTION

Problems to be Solved by the Invention

In the above-described patent document 1, the transmission attenuation rate of ultraviolet ray in a wavelength range of 300 to 380 nm is rendered 75% or more by blending a white pigment or an ultraviolet absorber into a polyethylene material constituting a container. In the above-described patent document 2, ultraviolet ray having a wavelength longer than 290 to 320 nm is blocked successfully. However, since there are also contents weak against ultraviolet ray having a wavelength of less the 290 nm (eye drops and the like), it is necessary to produce a light-shielding property also against ultraviolet ray having a wavelength of less the 290 nm. Particularly, in the case of use of an organic ultraviolet absorber as the ultraviolet absorber, there is a problem of easy transmission of ultraviolet ray around 270 nm, that is, in the case of use of an organic ultraviolet absorber, ultraviolet ray around 270 nm cannot be blocked.

In the above-described patent document 3, the optical transmittance at a wavelength of 200 nm to 700 nm is set to 3.0% or lower, thereby blocking ultraviolet ray around 270 nm described above. The above-described patent document 3, however, provides a constitution in which an inner layer composed of a thermoplastic resin containing a pigment having a light-shielding property is brought into contact with contents, namely, components of the contents adhere to the inner layer in some cases. For example, when an inorganic ultraviolet inhibitor is used as a pigment having a light-shielding property, the surface of a thermoplastic resin easily gets rough. It resultantly leads to adhesion of components of the contents to the inner layer.

The present invention has been made in view of the above-described state, and has an object of providing a light-shielding container which has an ultraviolet-ray transmittance of 0% at wavelengths of 200-370 nm and to which contents are less apt to adhere

Means for Solving to the Problems

For attaining the object, the present invention has the following characteristics.

The light-shielding container according to the present invention is light-shielding container for holding contents, characterized by having at least an inner layer composed of a thermoplastic resin, a first light-shielding layer composed of a resin containing an inorganic ultraviolet inhibitor and a second light-shielding layer composed of a resin containing an organic ultraviolet absorber, disposed in this order from the content side.

Advantageous Effects of the Invention

According to the present invention, it is possible that the ultraviolet-ray transmittance at wavelengths of 200-370 nm is 0% and contents are less apt to adhere to the container.

BRIEF DESCRIPTION OF THE DRAWINGS

FIG. 3 is a view showing the measurement results of a container of an example.

DESCRIPTION OF THE EMBODIMENTS

Summary of Light-Shielding Container 100 of the Present Embodiment

Figure 1:
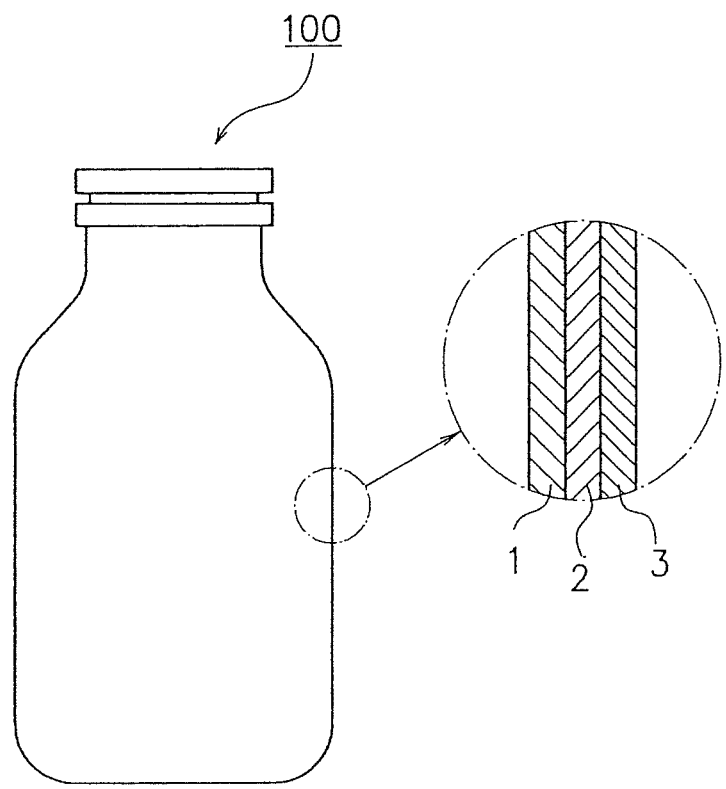
FIG. 1 is a view showing an example of the layer constitution of a light-shielding container 100 of the present embodiment.

First, the summary of a light-shielding container 100 of the present embodiment will be illustrated referring to FIG. 1.

The light-shielding container 100 of the present embodiment is a light-shielding container 100 for holding contents, being characterized by having at least an inner layer 1 composed of a thermoplastic resin, a first light-shielding layer composed of a resin containing an inorganic ultraviolet inhibitor (corresponding to intermediate layer 2) and a second light-shielding layer composed of a resin containing an organic ultraviolet absorber (corresponding to outer layer 3), disposed in this order from the content side.

Since the light-shielding container 100 of the present embodiment has the first light-shielding layer 2 composed of a resin containing an inorganic ultraviolet inhibitor and the second light-shielding layer 3 composed of a resin containing an organic ultraviolet absorber, the ultraviolet-ray transmittance at a wavelength of 200 to 370 nm can be suppressed to 0% owing to the two light-shielding layers 2,3 and the visibility of contents can be improved. For example, when a container is constituted of a single layer using a resin containing an inorganic ultraviolet inhibitor, transparency is poor and contents cannot be visually recognized. As a result, the visibility of contents is worse, and also the appearance of the container deteriorates.

In contract, since an inorganic ultraviolet absorber and an organic ultraviolet absorber are contained in separate layers in the constitution of the light-shielding container 100 of the present embodiment, the ultraviolet-ray transmittance at a wavelength of 200 to 370 nm can be made 0% and the excellent visibility of contents can be obtained without deteriorating the transparency of the container itself.

Further, since the light-shielding container 100 of the present embodiment has a constitution containing at least the inner layer 1, the first light-shielding layer 2 and the second light-shielding layer 3 disposed in this order from the content side, it is possible to prevent an organic ultraviolet absorber constituting the second light-shielding layer 3 from migrating into contents. As a result, a chemical reaction of the organic ultraviolet absorber and contents can be prevented, and inclusion of impurities in contents can be prevented. The organic ultraviolet absorber constituting the second light-shielding layer 3 easily bleeds out onto the surface of a resin, however, since the inner layer 1 and the first light-shielding layer 2 intervene between contents and the second light-shielding layer 3 and the inorganic ultraviolet inhibitor contained in the first light-shielding layer 2 suppresses the organic ultraviolet absorber from migrating to the content side, it is possible to prevent the organic ultraviolet absorber from bleeding out to migrate into contents.

Since the light-shielding container 100 of the present embodiment has the inner layer 1 composed of the thermoplastic resin as a layer contacting with contents, adhesion of contents to the inner layer 1 can be prevented. The thermoplastic resin constituting the inner layer 1 is preferably constituted of a resin having a low adsorptive property for components of contents. For example, since the first light-shielding layer 2 composed of a resin containing an inorganic ultraviolet inhibitor has a surface which easily gets rough, if the first light-shielding layer 2 is brought into contact with contents, it becomes easy for contents to adhere to the first light-shielding layer 2. In contrast, since the inner layer 1 composed of a thermoplastic resin is allowed to intervene between contents and the first light-shielding layer 2 in the light-shielding container 100 of the present embodiment, contents do not adhere to the first light-shielding layer 2 and adhesion of contents to the inner layer 1 can be made difficult. The light-shielding container 100 of this present embodiment will be illustrated in detail referring to appended drawings.

Example of Layer Constitution of Light-Shielding Container 100

First, examples of the layer constitution of the light-shielding container 100 of the present embodiment will be illustrated referring to FIG. 1.

The light-shielding container 100 of this embodiment is a light-shielding container 100 for holding contents, and has a constitution containing the inner layer 1, the intermediate layer 2 and the outer layer 3 as shown in FIG. 1. As the content, a medicinal solution weak against ultraviolet ray (wavelength: 200 to 370 nm) and the like can be suitably used.

The thermoplastic resin constituting the inner layer 1 includes olefinic resins and the like. The olefinic resin includes, for example, polyethylene resins (high density polyethylene, medium density polyethylene, low density polyethylene, linear low density polyethylene), cycloolefin polymer resins and polypropylene resins. These can be used singly or two or more of them can be used in combination. It is also possible to apply resins such as styrene resins (for example, polystyrene), polyester resins (for example, polyethylene terephthalate), vinyl resins (for example, polyvinyl chloride), AS reins, ABS resins and the like.

As the material constituting the inner layer 1 of this embodiment, it is preferable to use a resin having a gas barrier property and a low adsorptive property for components contained in contents. By this, oxidative deterioration of contents and degradation of components can be prevented. As such as resin, polyolefin resins, polyester resins such as polyethylene terephthalate (PET), polyethylene naphthalate (PEN) and the like, polyamide resins such as nylon 6, copolymerized nylon and the like, polyvinyl alcohol resins such as polyvinyl alcohol (PVA) resin, ethylene-vinyl alcohol copolymer (EVOH) and the like, amorphous polyolefin resins such as cyclic olefin polymer (COP), cyclic olefin copolymer (COC) and the like, etc. can be applied.

The inner layer 1 can be constituted of a single layer made of the above-described material or constituted of two or more layers made of the above-described materials, and for example, it is possible, by using a resin having a low adsorptive property for components of contents in the innermost layer and using a resin excellent in a gas barrier property in an adjacent layer, to suppress components of contents from adsorbing to a container and to give a good barrier performance.

The intermediate layer 2 is constituted of a resin containing an inorganic ultraviolet inhibitor, and the inhibitor includes ultrafine zinc oxide, titanium oxide, iron oxide and the like. As the titanium oxide, ultrafine particles of titanium oxide having a particle size of 0.01 to 0.05 μm are preferable since transparency is excellent. As the iron oxide, those having a particle size of 0.1 μm of less are preferable since transparency is excellent though slight coloration occurs. The addition amount of the inorganic ultraviolet inhibitor is 0.1 to 15 wt %. When the addition amount is less than 0.1 wt %, a property of blocking ultraviolet is poor, and when 15 wt % or more, transparency is poor, and contents cannot be visually recognized.

The outer layer 3 is constituted of a resin containing an organic ultraviolet absorber, and the absorber includes benzotriazoles, hydroxybenzophenones, benzoates, cyanoacrylates and the like. The benzotriazoles include 2,5-chlorobenzotriazole, 2-(5-methyl-2-hydroxyphenyl)benzotriazole, 2-(3-t-butyl-5-methyl-2-hydroxyphenyl)-5-chlorobenzotriazole and the like. The hydroxybenzophenones include 2-hydroxy-4-methyloxybenzophenone, 2-hydroxy-4-octyloxybenzophenone and the like. The benzoates include 2,4-di-t-butylphenyl-3,5-di-t-butyl-4-hydroxybenzoate and the like. The addition amount of the organic ultraviolet absorber is 0.01 to 1 wt %. When the addition amount is less than 0.01 wt %, a property of absorbing ultraviolet is poor, and when 1 wt % or more, the absorbing agent bleeds out, to cause deterioration of appearance and migration into contents.

In the constitution of the light-shielding container 100 of the present embodiments, it is preferable that the inner layer 1 has a thickness of 5 to 20%, the intermediate layer 2 has a thickness of 10 to 30% and the outer layer 3 has a thickness of 50 to 85% when the whole layer thickness is 100%.

The light-shielding container 100 of the present embodiment has a constitution having two light-shielding layers 2,3: an intermediate layer 2 constituted of a resin containing an inorganic ultraviolet inhibitor and an outer layer 3 constituted of the resin containing an organic ultraviolet absorber. Since the organic ultraviolet absorber permits easy transmission of ultraviolet ray having a wavelength around 270 nm, an inorganic ultraviolet inhibitor manifesting poor transmission of ultraviolet ray having a wavelength around 270 nm is contained in another layer, to provide two light-shielding layers 2,3. By this, transmission of ultraviolet ray having a wavelength of 200 to 370 nm can be prevented.

Since the light-shielding container 100 of the present embodiment has the inner layer 1 composed of a thermoplastic resin and the intermediate layer 2 constituted of a resin containing an inorganic ultraviolet inhibitor at the side closer to contents than the outer layer 3 constituted of a resin containing an organic ultraviolet absorber, it is possible to prevent the inorganic ultraviolet inhibitor constituting the outer layer 3 from migrating to the content side and being eluted in contents. As a result, migration of the organic ultraviolet absorber to contents can be prevented and inclusion of impurities in contents can be prevented. Since the intermediate layer 2 is constituted of a resin containing an inorganic ultraviolet inhibitor, its surface gets rough easily and contents easily adhere, therefore, the inner layer 1 constituted of a thermoplastic resin is allowed to intervene between contents and the intermediate layer 2, to make adhesion of contents to the inner layer 1 difficult. By this, a light-shielding container 100 in which contents are less apt to adhere can be obtained.

Action and Effect of Light-Shielding Container 100 of the Present Embodiment

Since the light-shielding container 100 of the present embodiment has a constitution having the inner layer 1 composed of a thermoplastic resin, the intermediate layer 2 composed of a resin containing an inorganic ultraviolet inhibitor and the outer layer 3 composed of a resin containing an organic ultraviolet absorber disposed in this order from the content side as described above, the ultraviolet-ray transmittance at a wavelength of 200 to 370 nm can be made 0% and adhesion of contents to the light-shielding container 100 can be made difficult.

Figure 2:
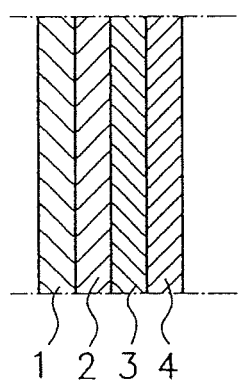
FIG. 2 is a view showing another example of the layer constitution of a light-shielding container 100.

The light-shielding container 100 shown in FIG. 1 is constituted of three layers: the inner layer 1, the intermediate layer 2 and the outer layer 3. It is also possible to further provide an outermost layer 4 outside the outer layer 3 as shown in FIG. 2.

In the outermost layer 4, a known thermoplastic resin can be appropriately used, and for example, it can be constituted of the same resin as for the inner layer 1 or an olefinic resin and the like. In the case of a constitution of four layers: the inner layer 1, the intermediate layer 2, the outer layer 3 and the outermost layer 4 as shown in FIG. 2, it is preferable that the inner layer 1 has a thickness of 5 to 20%, the intermediate layer 2 has a thickness of 10 to 20%, the outer layer 3 has a thickness of 30 to 75% and the outermost layer 4 has a thickness of 10 to 30% when the while layer thickness is 100%.

Since the outer layer 3 is constituted of a resin containing an organic ultraviolet absorber, the organic ultraviolet absorber easily bleeds out onto the surface of the resin. For this resin, the outermost layer 4 can be disposed outside the outer layer 3 to prevent exposure of the organic ultraviolet absorber to the outer surface of the light-shielding container 100. It is also possible to allow the outermost layer 4 to intervene between the inner layer 1 and the outer layer 3 to further reinforce prevention of migration of the organic ultraviolet absorber to contents. That is, a constitution in which the outermost layer 4 is disposed at the outer side than the inner layer 1 is also possible.

EXAMPLES

Next, examples of the light-shielding container 100 of the present embodiment will be illustrated. The following examples are only examples and the light-shielding container 100 of the present embodiment is not limited to the following examples.

Example 1

A light-shielding container 100 was constituted of an inner layer 1, an intermediate layer 2 and an outer layer 3 as shown in FIG. 1, and the inner layer 1 had a thickness of 170 μm, the intermediate layer 2 had a thickness of 130 μm and the outer layer 3 had a thickness of 360 μm, and the whole layer thickness was 660 μm.

The inner layer 1 was constituted of LDPE (low density polyethylene).

The intermediate layer 2 was constituted of a resin obtained by mixing LDPE and an inorganic ultraviolet inhibitor (zinc oxide). The blending rate of LDPE to zinc oxide was LDPE:titanium oxide=100:3.

The outer layer 3 was constituted of a resin obtained by mixing LDPE and a benzotriazole ultraviolet absorber (manufactured by BASF Japan K.K., TINUVIN 326) as an organic ultraviolet absorber. The blending rate of LDPE to the benzotriazole ultraviolet absorber was LDPE:benzotriazole ultraviolet absorber=100:0.25.

Example 2

The same constitution as in Example 1 was made excepting that the inner layer 1 in Example 1 was constituted of a cycloolefin polymer.

Example 3

The same constitution as in Example 1 was made excepting that the inner layer 1 in Example 1 was constituted of an ethylene-vinyl alcohol copolymer.

Example 4

A light-shielding container 100 was constituted of an inner layer 1, an intermediate layer 2, an outer layer 3 and an outermost layer 4 as shown in FIG. 2, and the inner layer 1 had a thickness of 170 μm, the intermediate layer 2 had a thickness of 100 μm, the outer layer 3 had a thickness of 300 μm, the outermost layer 4 had a thickness of 90 μm, and the whole layer thickness was 660 μm.

The inner layer 1, the intermediate layer 2 and the outer layer 3 were constituted of the same resins as in Example 1, and the outermost layer 4 was constituted of the same resin as for the inner layer 1.

Comparative Example 1

A container was constituted of a single layer. The thickness of the single layer was 660 μm, and the whole layer thickness was 660 μm.

The single layer was constituted of a resin obtained by mixing LDPE and a benzotriazole ultraviolet absorber. The blending rate of LDPE to the benzotriazole ultraviolet absorber was LDPE:benzotriazole ultraviolet absorber=100:0.25.

Comparative Example 2

A container was constituted of a single layer. The thickness of the single layer was 660 μm, and the whole layer thickness was 660 μm.

The single layer was constituted of a resin obtained by mixing LDPE and an inorganic ultraviolet inhibitor (titanium oxide). The blending rate of LDPE to titanium oxide was LDPE:titanium oxide=100:3.

Comparative Example 3

A light-shielding container was constituted of an inner layer, an intermediate layer and an outer layer, and the inner layer had a thickness of 170 μm, the intermediate layer had a thickness of 130 μm and the outer layer had a thickness of 360 μm, and the whole layer thickness was 660 μm.

The inner layer was constituted of LDPE.

The intermediate layer was constituted of a resin obtained by mixing LDPE and a benzotriazole ultraviolet absorber. The blending rate of LDPE to the benzotriazole ultraviolet absorber was LDPE:benzotriazole ultraviolet absorber=100:0.25.

The outer layer was constituted of a resin obtained by mixing LDPE and an inorganic ultraviolet inhibitor (titanium oxide). The blending rate of LDPE to titanium oxide was LDPE:titanium oxide=100:3.

(Measurement Result)

The measurement results of the containers of Examples 1 to 4 and Comparative Examples 1 to 3 are shown in FIG. 3. FIG. 3 shows the measurement results of the light-shielding property, transparency and eluting property of the containers.

(Light-Shielding Property)

Parts of the bodies of the containers of Examples 1 to 4 and Comparative Examples 1 to 3 were cut, test pieces having width 9 mm×length 40 mm and uniform thickness were made, and the test pieces were immersed in ultraviolet absorption spectrum measuring cells, and the transmittance at a wavelength of 200 to 372 nm in water was measured. A test piece showing a transmittance at a wavelength of 200 to 372 nm of 0% was evaluated as ○, and a test piece showing a transmittance other than 0% was evaluated as x.

(Transparency)

The above-described test pieces were immersed in ultraviolet absorption spectrum measuring cells, and the transmittance at a wavelength of 450 nm in water was measured. A test piece showing a transmittance at a wavelength of 450 nm of 20% or more was evaluated as ○, and a test piece showing a transmittance less than 20% was evaluated as x.

(Eluting Property)

Eye drops were filled in the containers of Examples 1 to 4 and Comparative Examples 1 to 3, allowed to stand at ambient temperature for one week, then, impurities contained in the eye drops were analyzed. No impurities contained was evaluated as ○, and the other result was evaluated as x.

As apparent from the measurement results shown in FIG. 3, the containers of Examples 1 to 4 were excellent in all the light-shielding property, transparency and eluting property. That is, it was found that the ultraviolet-ray transmittance at a wavelength of 200 to 372 nm can be made 0% by providing two light-shielding layers 2,3: a first light-shielding layer 2 composed of a resin containing an inorganic ultraviolet inhibitor and a second light-shielding layer 3 composed of a resin containing an organic ultraviolet absorber.

It was found that when the second light-shielding layer 3 is disposed at the side closer to contents than the first light-shielding layer 2, the organic ultraviolet absorber constituting the second light-shielding layer 3 migrates to contents and impurities are contained in contents even if the inner layer 1 is disposed at the side closer to contents than the second light-shielding layer 3 as apparent from the measurement results of Comparative Example 3. Thus, it was found that it is necessary to dispose the first light-shielding layer 2 at the side closer to contents than the second light-shielding layer 3 and to dispose the inner layer 1 at the side closer to contents than the first light-shielding layer 2 as in the containers of Examples 1 to 4. Further, it was found that contents are less apt to adhere to the inner layer 1 by disposing the inner layer 1 at the side closer to contents than the first light-shielding layer 2 as in Examples 1 to 4. Thus, it was found that the inner layer 1 is preferably constituted of a thermoplastic resin. Further, it was found that by constituting the inner layer 1 of an ethylene-vinyl alcohol copolymer as in Example 3, the inner layer 1 can be endowed with a gas barrier property and oxidative deterioration of contents can be prevented. Furthermore, it was found that by disposing the outermost layer 4 outside the outer layer 3 as in Example 4, the organic ultraviolet absorber constituting the second light-shielding layer 3 is not exposed to the surface of the container.

The embodiments and the examples described above are suitable embodiments and examples of the present invention, and the scope of the present invention is not limited only to the above-described embodiments and examples, and various modifications can be made in a range not deviating from the gist of the present invention.

DESCRIPTION OF REFERENCE NUMERALS 100 light-shielding container
1 inner layer
2 intermediate layer
3 outer layer
4 outermost layer

What is claimed is:

1. A light-shielding container for holding contents, the light-shielding container comprising:
at least an inner layer composed of a thermoplastic resin;
a first light-shielding layer consisting of a resin and an inorganic ultraviolet inhibitor; and a second light-shielding layer consisting of a resin and an organic ultraviolet absorber, disposed in an order such that from a content holding side of the light-shielding container toward an outer side of the light-shielding container said inner layer is followed by said first light-shielding layer and said first light-shielding layer is followed by said second light-shielding layer, wherein a thickness of said second light-shielding layer is larger than a thickness of said inner layer, and the thickness of said second light-shielding layer is larger than a thickness of said first light-shielding layer, a composition of the first light-shielding layer is different from a composition of the second light-shielding layer, the thermoplastic resin of the inner layer comprises a cycloolefin polymer, and the resin of the second light-shielding layer comprises low density polyethylene.

2. The light-shielding container according to claim 1, wherein said inner layer has a low adsorptive property for components of said contents.

3. The light-shielding container according to claim 1, wherein said inner layer has a gas barrier property.

4. The light-shielding container according to claim 1, further comprising an outer most layer outside said second light-shielding layer.

5. The light-shielding container according to claim 2, wherein said inner layer has a gas barrier property.

6. The light-shielding container according to claim 2, further comprising an outer most layer outside said second light-shielding layer.

7. The light-shielding container according to claim 3, further comprising an outer most layer outside said second light-shielding layer.

8. The light-shielding container according to claim 5, further comprising an outer most layer outside said second light-shielding layer.

9. The light-shielding container according to claim 1, wherein said inner layer has a thickness of 5 to 20%, said first light-shielding layer has a thickness of 10 to 30%, and said second light-shielding layer has a thickness of 50 to 85% when a whole layer thickness is 100%.

10. The light-shielding container according to claim 2, wherein said inner layer has a thickness of 5 to 20%, said first light-shielding layer has a thickness of 10 to 30%, and said second light-shielding layer has a thickness of 50 to 85% when a whole layer thickness is 100%.

11. The light-shielding container according to claim 3, wherein said inner layer has a thickness of 5 to 20%, said first light-shielding layer has a thickness of 10 to 30%, and said second light-shielding layer has a thickness of 50 to 85% when a whole layer thickness is 100%.

12. The light-shielding container according to claim 5, wherein said inner layer has a thickness of 5 to 20%, said first light-shielding layer has a thickness of 10 to 30%, and said second light-shielding layer has a thickness of 50 to 85% when a whole layer thickness is 100%.

13. The light-shielding container according to claim 4, wherein said inner layer has a thickness of 5 to 20%, said first light-shielding layer has a thickness of 10 to 20%, said second light-shielding layer has a thickness of 30 to 75% and said outer most layer has a thickness of 10 to 30% when a whole layer thickness is 100%.

14. The light-shielding container according to claim 6, wherein said inner layer has a thickness of 5 to 20%, said first light-shielding layer has a thickness of 10 to 20%, said second light-shielding layer has a thickness of 30 to 75% and said outer most layer has a thickness of 10 to 30% when a whole layer thickness is 100%.

15. The light-shielding container according to claim 7, wherein said inner layer has a thickness of 5 to 20%, said first light-shielding layer has a thickness of 10 to 20%, said second light-shielding layer has a thickness of 30 to 75% and said outer most layer has a thickness of 10 to 30% when a whole layer thickness is 100%.

16. The light-shielding container according to claim 8, wherein said inner layer has a thickness of 5 to 20%, said first light-shielding layer has a thickness of 10 to 20%, said second light-shielding layer has a thickness of 30 to 75% and said outer most layer has a thickness of 10 to 30% when a whole layer thickness is 100%.

17. The light-shielding container according to claim 1, wherein the inorganic ultraviolet inhibitor contained in said first light-shielding layer is 0.1 to 15 wt % of said first light-shielding layer.

* * * * *